US011371946B2

(12) United States Patent
Casadio (10) Patent No.: US 11,371,946 B2
(45) Date of Patent: Jun. 28, 2022

(54) APPARATUS AND METHOD FOR OPTICAL INSPECTION OF OBJECTS

(71) Applicant: SACMI COOPERATIVA MECCANICI IMOLA SOCIETA' COOPERATIVA, Imola (IT)

(72) Inventor: Marco Casadio, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 17/046,232

(22) PCT Filed: Apr. 8, 2019

(86) PCT No.: PCT/IB2019/052868
§ 371 (c)(1),
(2) Date: Oct. 8, 2020

(87) PCT Pub. No.: WO2019/197966
PCT Pub. Date: Oct. 17, 2019

(65) Prior Publication Data
US 2021/0072164 A1    Mar. 11, 2021

(30) Foreign Application Priority Data
Apr. 9, 2018   (IT) .................. 102018000004312

(51) Int. Cl.
*G01N 21/90*    (2006.01)
(52) U.S. Cl.
CPC ... *G01N 21/909* (2013.01); *G01N 2201/0633* (2013.01)

(58) Field of Classification Search
CPC .. G01N 21/90; G01N 21/909; G01N 21/9081; G01N 21/9072; G01N 2021/9063; G01N 21/9054; G01N 21/9045; G01N 21/9036; G01N 21/9018; G01N 21/9009; G01N 21/9027; G01N 21/8851;
(Continued)

(56) References Cited
U.S. PATENT DOCUMENTS 4,750,035 A * 6/1988 Chang .................. G01N 21/90
250/223 B
5,220,400 A * 6/1993 Anderson ........... G01N 21/909
356/240.1
(Continued)

FOREIGN PATENT DOCUMENTS

EP    0429086 A1 *  5/1991   ............. G01N 21/90
EP    1477794 B1    8/2009
(Continued)

*Primary Examiner* — Michael P Stafira
(74) *Attorney, Agent, or Firm* — Pearne & Gordon LLP (57) ABSTRACT

An apparatus (1) for optical inspection of objects (2) comprises: a conveyor (3) configured to transport the objects (2) in succession, each object (2) having a bottom wall (21), which rests on the conveyor (3), and a side wall (22); an inspection station (4), disposed along the conveyor (3); an illuminator (6) mounted above the inspection station (4) to emit a beam of light rays towards the conveyor (3); a first lens (7) configured to transmit a corresponding beam of collimated rays; a second lens (8) configured to make the light rays converge on the side wall (22) of the object (2) to be inspected.

20 Claims, 6 Drawing Sheets

(58) Field of Classification Search
CPC ....... G01N 21/8806; G01N 2033/0081; G01N 2021/8887; G01N 21/954; G01N 21/958; G01N 21/88; G01N 21/952; G01N 23/04; G01N 21/9508; G01N 2021/845; G01N 21/95; G01N 2021/8832; G01N 21/51; G01N 35/04; G01N 21/956; G01N 35/00732; G01N 25/72; G01N 2291/2695; G01N 2291/044; G01N 2201/06113
See application file for complete search history.

(56) References Cited

U.S. PATENT DOCUMENTS

| | | | |
|---|---|---|---|
| 5,592,286 A * | 1/1997 | Fedor | G01N 21/909 356/240.1 |
| 5,898,169 A | 4/1999 | Nordbryhn | |
| 6,175,107 B1 | 1/2001 | Juvinall | |
| 10,281,700 B1 * | 5/2019 | Nahum | G02B 7/102 |
| 10,393,670 B1 * | 8/2019 | Sones | G01N 21/909 |
| 10,408,769 B2 | 9/2019 | Casadio | |
| 2001/0005264 A1 * | 6/2001 | Slemon | G01N 21/952 356/237.2 |
| 2014/0362207 A1 * | 12/2014 | Leconte | G01N 21/9045 348/86 |
| 2018/0321163 A1 | 11/2018 | Casadio | |

FOREIGN PATENT DOCUMENTS

| | | | | |
|---|---|---|---|---|
| EP | 0961113 B1 | | 3/2010 | |
| EP | 1985997 B1 | | 1/2013 | |
| ES | 2675053 T3 | * | 7/2018 | ......... G01N 21/9036 |
| JP | 2000028323 A | * | 1/2000 | |
| JP | 2001519028 A | * | 10/2001 | |
| JP | 2004294097 A | * | 10/2004 | |
| JP | 2004294256 A | * | 10/2004 | |
| WO | 2017109635 | | 6/2017 | |
| WO | WO-2017109635 A1 | * | 6/2017 | .......... G01N 21/909 |
| WO | WO-2018184907 A1 | * | 10/2018 | .......... G02B 5/0231 |

\* cited by examiner

APPARATUS AND METHOD FOR OPTICAL INSPECTION OF OBJECTS

TECHNICAL FIELD

This invention relates to an apparatus and a method for optical inspection of objects.

BACKGROUND ART

Industrial processes for the processing of objects such as containers for food products (tin cans, bottles, jars) generally include optical inspection of the outside surface of the containers. The purpose of optical inspection is not only to detect scratches or dents but also to identify possible defects of the decorative enamel coating previously applied to the surface of the containers by one or more rollers and subsequently fixed, preferably in an oven.

Patent document EP0961113B1 provides an apparatus for inspecting a container, comprising a first light source to illuminate a portion of a surface of the container, a second light source to illuminate the same portion of the surface of the container (with a light of a different character), a sensor responsible for capturing a two-dimensional image of the portion of the container illuminated by the first light source and by the second light source. In that solution, the surface is illuminated one portion at a time and, what is more, the portion of the surface inspected depends strictly on the position of the object relative to the two light sources. The system is therefore very sensitive to the position of the object.

Similarly, patent document EP1985997B1 provides an apparatus for inspecting labels on containers being transported on a conveyor. The apparatus includes a first illumination device, disposed at least partly above the outside surface of the container, and a detection device which receives the light reflected from the outside surface of the container. In this case, too, only one portion of the surface (the one covered by the label) is illuminated and the precise positioning of the container relative to the illumination devices is crucial for illuminating that portion correctly.

Patent document EP1477794B1 relates to an apparatus for optical inspection of bottles moving on a conveyor. The apparatus includes illumination means located above the bottle, optical means oriented parallel to an axis of the bottle and configured as diffusers or reflectors, and an image capturing device configured to capture an image of the side wall of the illuminated bottle. Arranging the optical means parallel to the axis of the bottle has the disadvantage that the image of the bottle captured by the camera is undesirably affected by reflected light from the adjacent bottle upstream and downstream of the bottle being inspected.

Also known from patent document WO2017/109635A1 in the name of the same Applicant as the present is an apparatus for optical inspection of objects transported in succession on a conveyor belt. The apparatus comprises a lighting system mounted above the object, and two lenses—a collimating lens and a converging lens—both interposed between the lighting system and the object. The disadvantage of this system is that if the conveyor belt is arcuate, or curved, and the object is not perfectly centred relative to the axis of the illuminator, dark shadows are cast on the side wall of the object. To overcome this problem, it would be necessary to reduce the distance between the converging lens and the object; this, however, would have the undesired effect of illuminating the part of the object closer to the conveyor belt more than the part further away from the conveyor belt.

DISCLOSURE OF THE INVENTION

The aim of this invention is to provide an apparatus and a method for optical inspection of objects to overcome the above mentioned disadvantages of the prior art.

These aims are fully achieved by the apparatus and method of this disclosure as characterized in the appended claims.

This disclosure thus provides an apparatus and a method for optical inspection of objects. This disclosure also provides an apparatus and a method for detecting defects in the decoration of objects.

In one embodiment, the apparatus comprises a conveyor. In one embodiment, the conveyor is a conveyor belt. In one embodiment, the conveyor is at least partly arcuate. If the conveyor is arcuate, the object being inspected is subject to less interference (shadow zones) from adjacent objects; if the second lens is unsuitable, however, the side wall of the object is not illuminated uniformly. The conveyor is configured to transport the objects to be inspected in succession (that is, one after the other). The objects may be, for example, cans, bottles, jam jars, food tins. Each object has a bottom wall which rests on the conveyor. Each object has a side wall extending round a respective axis of the object. In one embodiment, the object is centrally symmetric about the axis (of the object). Preferably, the object is cylindrically symmetric about the axis (of the object).

The apparatus includes an inspection station. The inspection station is disposed along the conveyor. The inspection station is configured to receive an object to be inspected. In the inspection station, the object to be inspected is positioned with the axis (of the object) oriented along a longitudinal direction. In the inspection station, the object rests on the conveyor. The inspection station includes at least one camera (in one embodiment, at least two cameras; preferably, four cameras). The at least one camera is directed at the object to be inspected. The at least one camera is configured to capture an image of the side wall of the object to be inspected. In one embodiment, the at least one camera is configured to capture rays reflected from the side wall of the object. The apparatus includes an illuminator. The illuminator is positioned above the inspection station, along the longitudinal direction. The illuminator is configured to emit a beam of light rays towards the conveyor.

The apparatus includes a collimator. The collimator is interposed between the conveyor and the illuminator, to receive the beam of light rays. The collimator is configured to transmit a corresponding beam of collimated rays along the longitudinal direction. In an embodiment, the collimator includes (or is or is defined by) a first lens.

In an embodiment, the apparatus includes the first lens. The first lens is, preferably, a collimating lens. The first lens is interposed between the conveyor and the illuminator. The first lens is configured to receive the beam of light rays (from the illuminator). The first lens is configured to transmit a corresponding beam of collimated rays along the longitudinal direction. In a preferred embodiment, the first lens is a Fresnel lens. In one embodiment, the first lens is disposed at right angles to the longitudinal direction. Alternatively, the first lens might also be a convex/concave lens.

In an embodiment, the collimator is integrated with the illuminator, namely the illuminator is configured to emit a beam of collimated rays.

The apparatus includes a focalizer. The focalizer is interposed between the conveyor and the collimator, to receive the beam of collimated rays. The focalizer is configured to make the light rays converge on the side wall of the object to be inspected.

In an embodiment, the focalizer includes (or is or is defined by) a lens. Said lens is interposed between the illuminator and the conveyor. Preferably, said lens is a converging lens.

In the embodiment wherein each of the collimator and the focalizer includes a respective lens, the lens of the focalizer is also called in the following "second lens". The apparatus includes the second lens. The second lens is, preferably, a converging lens. The second lens is interposed between the conveyor and the first lens. The second lens is configured to make the light rays (from the first lens) converge on the side wall of the object to be inspected. In one embodiment, the first lens is disposed at a distance of approximately 330 mm from the illuminator.

In possible embodiments, the conveyor is outside (and thus does not form part of) the optical inspection apparatus.

The focalizer includes a plurality of lens portions (in the following, called also "portions").

In an embodiment, the lens includes said plurality of portions.

In an embodiment, the second lens includes said plurality of portions. In other words, the second lens is divided into a plurality of portions.

The plurality of portions includes at least a first portion and a second portion. Thus, in one embodiment, the second lens includes a first portion and a second portion.

Each of the portions has a respective focus. By focus (or focal point) of a lens portion is meant the point where a beam of light rays originating from infinity (or beam of collimated rays) is made to converge by that lens portion. In one embodiment, the focus of each portion of the second lens is different from that of the others. The focuses of the different portions of the second lens belong to (that is, are positioned in) different focal planes. The focuses of the different portions of the second lens belong to (that is, are positioned in) focal planes which are offset along the longitudinal direction. By focal plane is meant the plane parallel to the second lens (or portion of the second lens) which the respective focus belongs to. The focal plane is thus at right angles to the longitudinal direction.

In one embodiment, the lens portions include a first portion and a second portion. In one embodiment, the first portion is configured to direct a first group of rays at a first focal point. In one embodiment, the second portion is configured to direct a second group of rays at a second focal point. The first focal point is positioned in a first focal plane. The second focal point is positioned in a second focal plane. The first focal plane and the second focal plane are preferably offset along the longitudinal direction.

In a preferred embodiment, the portions of the (second) lens are respective portions of a Fresnel lens (or two or more Fresnel lenses). Thus, the (second) lens includes a plurality of Fresnel lenses or portions of Fresnel lenses or portions of one Fresnel lens.

The embodiment where the first and/or second lenses are Fresnel lenses allows having lenses which are large in size, reduced in weight and limited in cost. In effect, in one embodiment, the first lens and the second lens are 400 mm in diameter.

In one embodiment, the lens portions are portions of convex/concave lenses.

In one embodiment, the (second) lens is in the form of a lens assembly whose respective focuses belong to different focal planes. In one embodiment, the lenses making up the lens assembly are Fresnel lenses.

The division of the (second) lens into a plurality of portions means that the entire side wall of the object can be uniformly illuminated.

In one embodiment, the illuminator includes a light source which is discoidal (that is, shaped like a disk). The discoidal light source lies preferably in a plane at right angles to the longitudinal direction. The discoidal light source is preferably symmetrical about a central axis. The central axis is parallel to the longitudinal direction. The central axis, preferably coincides with the axis of the object positioned in the inspection station; the central axis, however, might not coincide exactly with the axis of the object which may be slightly inclined if the conveyor is arcuate. The fact that the illuminator is disc shaped advantageously allows obtaining a very bright and easy to make light source.

In one embodiment, the illuminator includes a light source which is annular (that is, shaped like a ring or a circular crown). The circular light source is preferably symmetrical about a central axis, parallel to the longitudinal direction (and preferably coinciding with the axis of the object positioned in the inspection station).

In one embodiment, the lens portions are concentric with the central axis. In one embodiment, at least one of the lens portions has the shape of a circular crown (i.e., it is annular). Preferably, the lens portions include a (central) disc-shaped portion and at least one circular crown shaped portion (surrounding the disc shaped portion). The fact that the lens portions are concentric advantageously allows uniformly illuminating the entire side wall of objects with cylindrical geometry.

In one embodiment, the lens portions (of the plurality of lens portions) lie in respective parallel planes which are spaced from each other. The planes are at right angles to the longitudinal direction. In this embodiment, the (second) lens is a "stepped lens", where each lens portion constitutes a step. The different portions are preferably joined together by respective connecting elements. More precisely: the central disc-shaped portion is joined to a first circular crown shaped portion which is in turn joined to a second circular crown shaped portion, and so on. The central portion may be connected to a mounting column to support all the portions of the second lens.

In such an embodiment, where the (second) lens is a "stepped lens", it is possible to use portions with the same focal length disposed at different distances from the object to obtain portions with focuses in different focal planes which are offset along the longitudinal direction. It is also possible to use portions with different focal lengths disposed at different distances from the object to obtain portions with focuses in different focal planes which are offset along the longitudinal direction. By focal length (or focal distance) is meant the distance between the plane which the lens (or lens portion) lies in and the plane which the focus of that lens (or lens portion) lies in and which is also called the focal plane.

In one embodiment, the lens portions (of the plurality of lens portions) disposed at positions proximal to the central axis are relatively further away from the conveyor than the lens portions which are disposed at positions distal from the central axis. In this embodiment, the portions closer to the conveyor are the outer portions and thus do not interfere with the light rays from the portions which are further away from the conveyor. In this embodiment, the light rays which are transmitted by lens portions which are more proximal to the central axis (that is, the more central ones) may be directed onto portions of the lateral surface of the object further away from the conveyor while the light rays which are transmitted by lens portions which are more distal from the central axis (that is, the more peripheral ones) are directed onto portions of the lateral surface of the object which are closer to the conveyor.

In one embodiment, the lens portions (of the plurality of lens portions) disposed at positions proximal to the central axis are relatively closer to the conveyor than the lens portions which are disposed at positions distal from the central axis. In this embodiment, the light rays which are transmitted by lens portions which are more proximal to the central axis (that is, the more central ones) may be directed onto portions of the lateral surface of the object closer to the conveyor while the light rays which are transmitted by lens portions which are more distal from the central axis (that is, the more peripheral ones) are directed onto portions of the lateral surface of the object which are further away from the conveyor.

In one embodiment, the lens portions (of the plurality of lens portions) are coplanar and have focal lengths which differ from each other. In this embodiment, the (second) lens is a graduated lens (that is, a lens with variable focal length). In one embodiment, the portions are portions of Fresnel lenses with focal lengths which differ from each other. For example, the focal lengths of the portions may be 220 mm, 330 mm, 350 mm.

In one embodiment, a second (minimum) distance of the second lens from the conveyor is less than a first distance of the first lens from the light source. In one embodiment, the second (minimum) distance of the second lens from the conveyor is 220 mm. The fact that the second lens is closer to the conveyor has the advantage of optimally illuminating the object, thus avoiding or at least reducing shadows (especially if the conveyor is arcuate). The second distance of the second lens from the conveyor is one of the following: if the portions of the second lens lie in the same plane, the distance of any portion from the plane on which the bottom wall of the object rests; if the portions disposed at positions proximal to a central axis relatively closer to the conveyor, the distance of the central portion from the plane on which the bottom wall of the object rests. if the portions disposed at positions proximal to a central axis relatively further from the conveyor, the distance of the outermost portion from the plane on which the bottom wall of the object rests. The plane on which the bottom wall of the object rests is defined by the conveyor.

In one embodiment, the different portions are obtained by superposing two or more Fresnel lenses. More specifically, a central portion comprises a single Fresnel lens, while peripheral portions (having the shape of a circular crown) are obtained by superposing a number Fresnel lenses, where the number of lenses gradually increases from the centre outwards (away from the central portion). In this embodiment, the outer lenses (superposed) illuminate an upper part of the side wall of the object (distant from the bottom wall) while the inner lenses (not superposed) illuminate a lower part of the side wall of the object (close to the bottom wall).

In one embodiment, the light source is three-dimensional and the first lens comprises a plurality of portions having respective focuses. In one embodiment, the focus of each portion of the first lens is different from that of the others. The focuses of the different portions of the first lens belong to different focal planes. The focuses of the different portions of the first lens belong to focal planes which are offset along the longitudinal direction.

In one embodiment of it, this disclosure provides an inspection device. The inspection device comprises an inspection station, disposed along a conveyor and configured to receive an object to be inspected oriented with its axis along a longitudinal direction. The inspection station includes at least one camera directed at the object to be inspected to capture an image of the side wall of the object to be inspected. The inspection device comprises an illuminator mounted above the inspection station along the longitudinal direction to emit a beam of light rays towards the conveyor. The inspection device comprises a first lens (collimating lens), interposed between the conveyor and the illuminator and configured to transmit a corresponding beam of collimated rays along the longitudinal direction. The inspection device comprises a second lens (converging lens) interposed between the conveyor and the first lens, to receive the beam of collimated rays, and configured to make the light rays converge on the side wall of the object to be inspected.

This disclosure also provides a method for optical inspection of objects.

In one embodiment of it, the method comprises a step of conveying the objects in succession on a conveyor. Each object has a bottom wall resting on the conveyor and a side wall extending round a respective axis (of the object).

In one embodiment, the step of conveying is not part of the method for optical inspection of objects.

In one embodiment, the method comprises a step of receiving an object to be inspected, oriented with its axis along a longitudinal direction, in an inspection station positioned along the conveyor.

In one embodiment of it, the method comprises a step of emitting a beam of light rays towards the conveyor. The light rays are emitted by an illuminator. The illuminator is positioned above the inspection station, along the longitudinal direction.

In one embodiment of it, the method comprises a step of receiving the beam of light rays on collimator. The collimator is interposed between the conveyor and the illuminator. In an embodiment, the collimator is (or is defined by, or includes) a first lens. In one embodiment, the first lens is a collimating lens. The first lens is interposed between the conveyor and the illuminator. In one embodiment of it, the method comprises a step of transmitting a corresponding beam of collimated rays along the longitudinal direction through the collimator (in an embodiment, through the first lens).

In one embodiment of it, the method comprises a step of receiving the beam of collimated light rays on a focalizer. The focalizer is interposed between the conveyor and the collimator.

In an embodiment, the focalizer is (or is defined by, or includes) a lens. Said lens is interposed between the illuminator and the conveyor.

In an embodiment, the focalizer is (or is defined by, or includes) a second lens. The second lens is interposed between the conveyor and the first lens.

In one embodiment of it, the method comprises a step of directing the light rays at the side wall of the object through the focalizer (in an embodiment, the second lens). The focalizer (in an embodiment, the second lens) makes the light rays converge on the side wall of the object.

In one embodiment, in the context of the rays directed towards the side wall of the object to be inspected, the focalizer (in an embodiment, the second lens) makes different groups of rays converge on respective focal points (focuses). In one embodiment, the focal points (focuses)

differ from each other. The focal points are positioned in focal planes which are offset along the longitudinal direction. Preferably, the focuses are aligned along a central axis. Thus, the focalizer (in an embodiment, the second lens) includes a plurality of lens portions (or portions) which focus on respective, different focal planes which are offset along the longitudinal direction. That way, the rays transmitted by the different portions are directed at corresponding different portions of the side wall of the object.

In one embodiment, there is, downstream of the focalizer (in an embodiment, the second lens), a beam of rays which includes a plurality of rays. The focalizer (in an embodiment, the second lens) is shaped in such a way that the beam of rays downstream of the focalizer comprises a first group of rays and a second group of rays. The first group of rays is directed towards a first focal point. The second group of rays is directed towards a second focal point. The first focal point and the second focal point are positioned in focal planes which are preferably offset along the longitudinal direction.

In one embodiment, at least one of the portions of the second lens has the shape of a circular crown. In one embodiment, the portions of the second lens are concentric with a central axis.

With regard to the shape of the second lens, what is stated above in relation to the apparatus applies also to the method.

In one embodiment, the illuminator comprises a disc shaped light source. In one embodiment, the light source is shaped like a disc which is larger in diameter than the bottom wall of the object to be inspected. For example, the disc of the light source might be 80 mm in diameter, while the bottom wall of the object might be 60 mm in diameter.

In one embodiment, the light source is symmetrical about the central axis. In one embodiment, the central axis coincides with the axis of the object positioned in the inspection station (although it might not coincide exactly if the conveyor is arcuate). Thus, in one embodiment, the object, the portions of the second lens and the light source are all symmetrical about the same central axis.

In one embodiment of it, the method comprises a step of capturing an image of the side wall of the object using at least one camera directed towards the object to be inspected.

In effect, rays directed by the second lens converge on the side wall of the object. The side wall is preferably reflective. Thus, the side wall of the object reflects the light rays directed towards it. During the step of capturing, the camera preferably captures the rays reflected from the side wall of the object. Thus, in a preferred embodiment, the system works by reflection.

This disclosure also provides an optical system. The optical system comprises a support surface configured to receive and support an object. In one embodiment, the support surface is defined by a conveyor (preferably, a conveyor belt). The object has a bottom wall supported by the support surface. The object has a side wall extending round a respective axis.

The optical system comprises an illuminator. The illuminator is mounted above the support surface along a longitudinal direction at right angles to the support surface to emit a beam of light rays towards the support surface.

In an embodiment, the optical system comprises a collimator. In an embodiment, the collimator is (or includes, or is defined by) a first lens (collimating lens). The collimator is interposed between the support surface and the illuminator, to receive the beam of light rays. The collimator is configured to transmit a corresponding beam of collimated rays along the longitudinal direction.

In an embodiment, the collimator is integrated with the illuminator, namely the illuminator is configured to emit a beam of collimated rays.

The optical system comprises a focalizer. In an embodiment, the focalizer is (or includes, or is defined by) a lens (converging lens). In an embodiment, the focalizer is (or includes, or is defined by) a second lens (converging lens).

The focalizer is interposed between the support surface and the first lens, to receive the beam of collimated rays. The focalizer is configured to make the light rays converge on the side wall of the object to be inspected. The focalizer includes a plurality of lens portions which have respective focuses belonging to different focal planes which are offset along the longitudinal direction.

In one embodiment, at least one of the lens portions has the shape of a circular crown, i.e., it is annular. In one embodiment, the portions of the second lens are concentric with a central axis.

In one embodiment, the lens portions lie in respective parallel planes which are spaced from each other and at right angles to the longitudinal direction.

In one embodiment, the lens portions disposed at positions proximal to a central axis are relatively closer to the support surface than the lens portions which are disposed at positions distal from the central axis. In another embodiment, the lens portions disposed at positions distal from a central axis are relatively closer to the support surface than the lens portions which are disposed at positions proximal to the central axis.

In one embodiment, the first lens is a Fresnel lens. In an embodiment, the lens (or the second lens) includes a plurality of Fresnel lenses or portions of the second Fresnel lens.

BRIEF DESCRIPTION OF DRAWINGS

These and other features will become more apparent from the following detailed description of a preferred embodiment, illustrated by way of non-limiting example in the accompanying drawings, in which.

DETAILED DESCRIPTION OF PREFERRED EMBODIMENTS OF THE INVENTION

Figure 1:
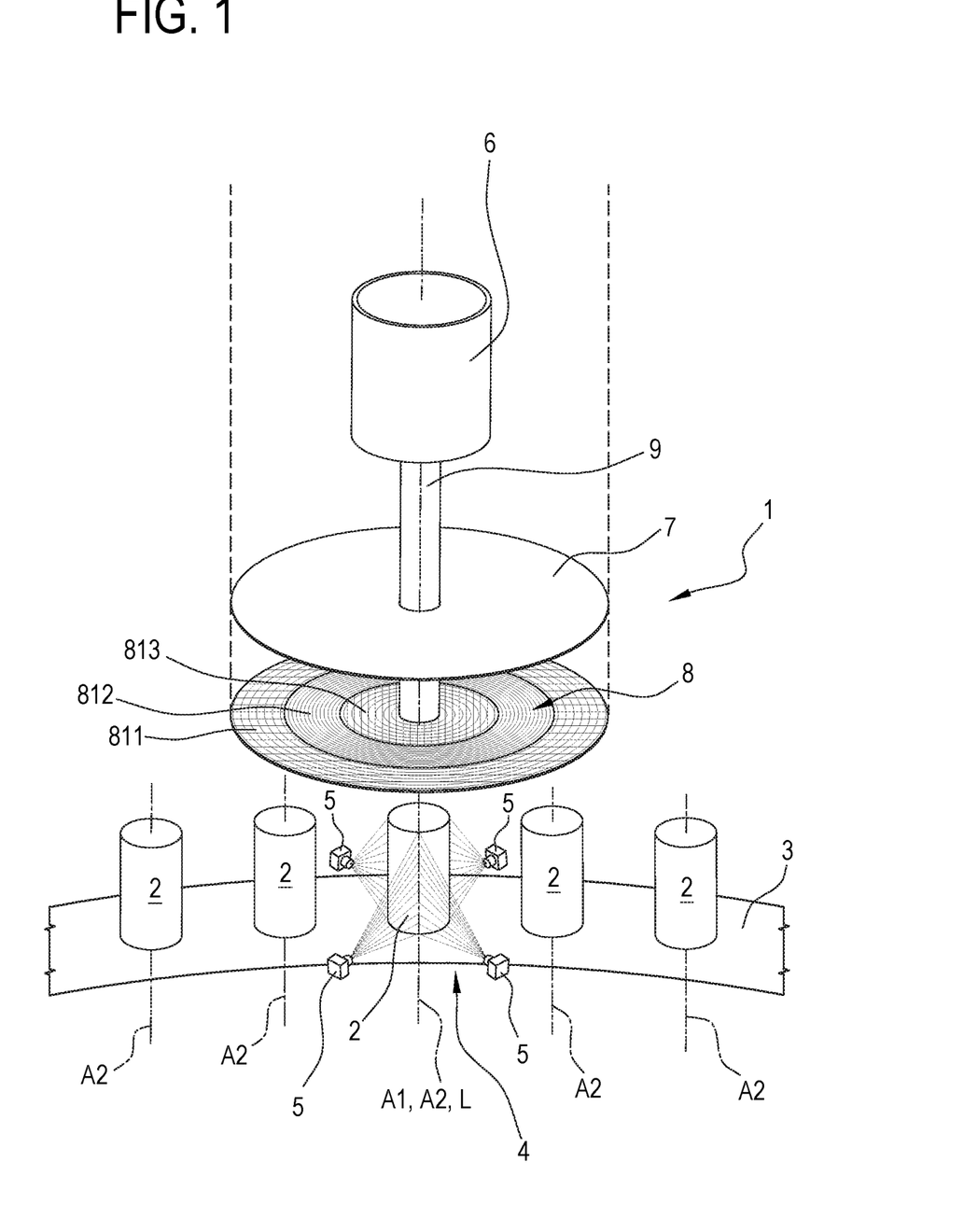
FIG. 1 shows a perspective view of an apparatus for optical inspection of objects according to this disclosure.
Figure 2:
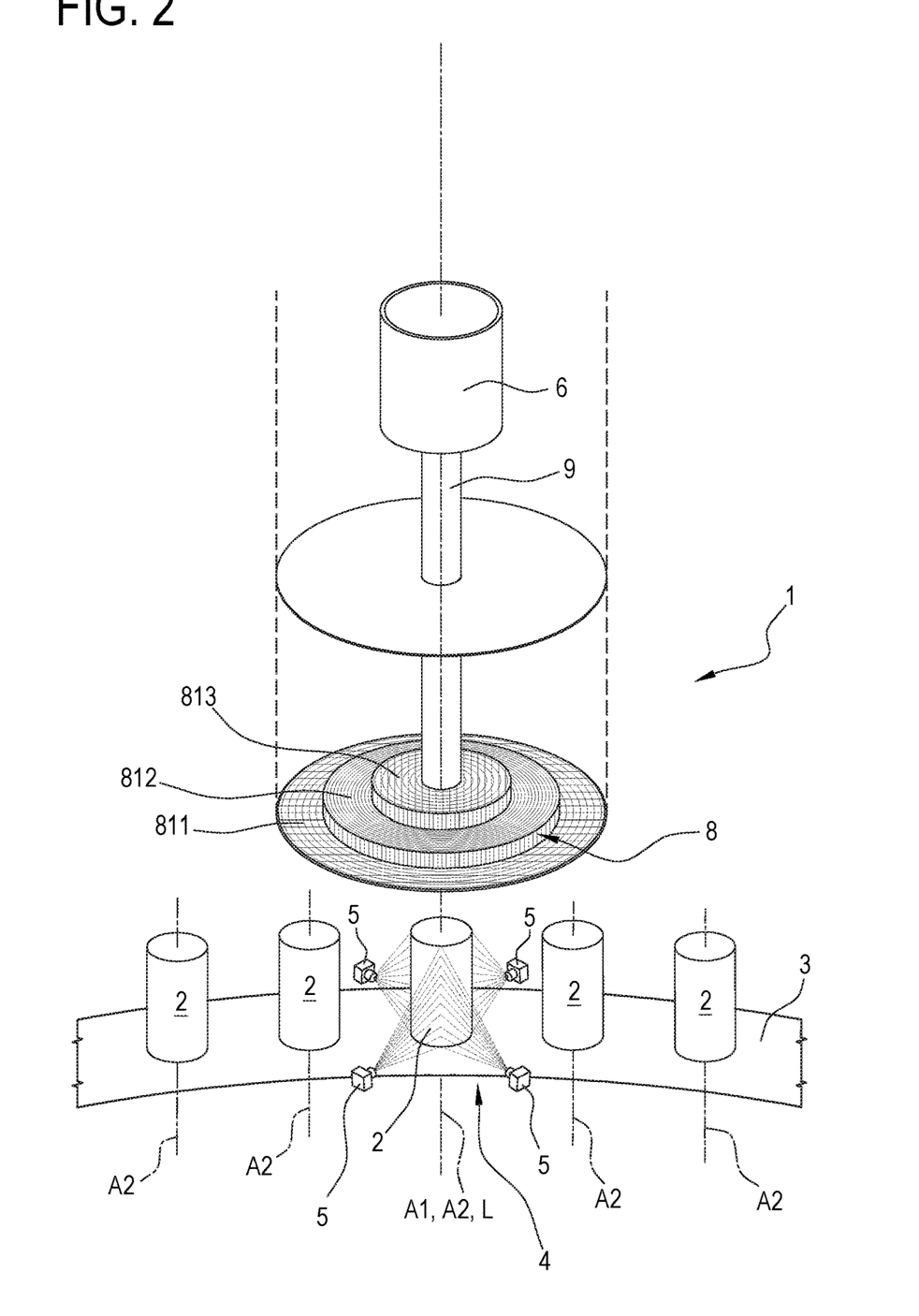
FIG. 2 shows a perspective view of a variant embodiment of the apparatus of FIG. 1.
Figure 3:
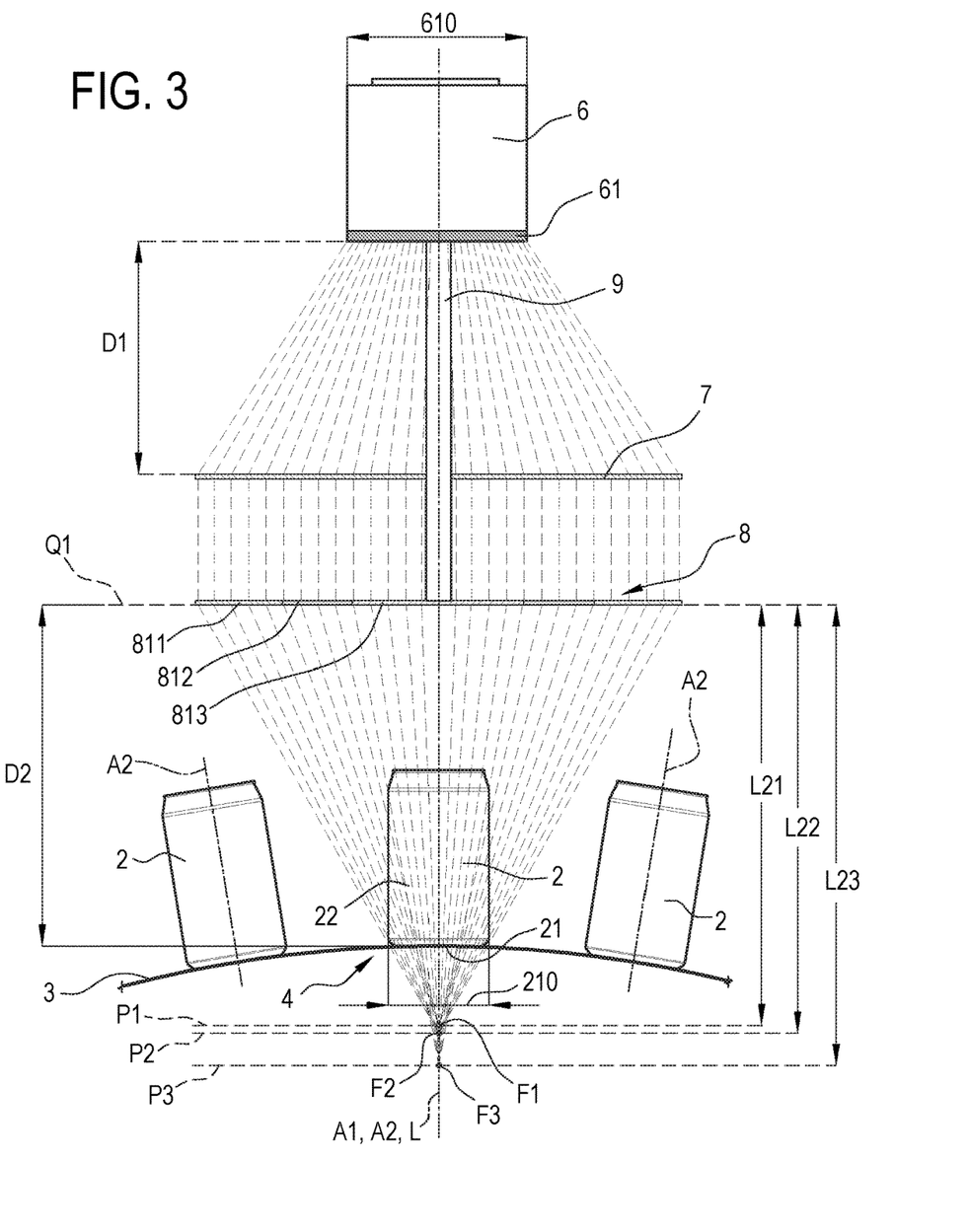
FIG. 3 is a side view of the apparatus of FIG. 1.
Figure 3A:
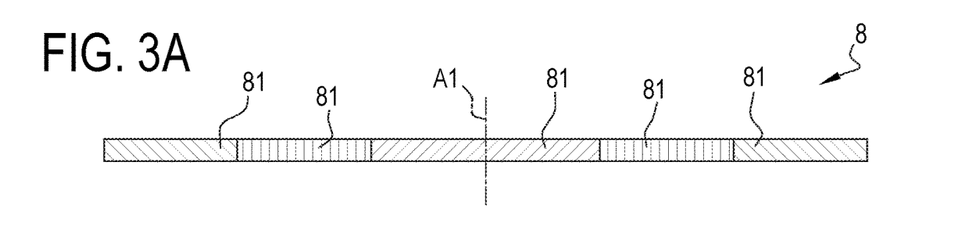
FIG. 3A shows a cross section of a detail from FIG. 3.
Figure 4:
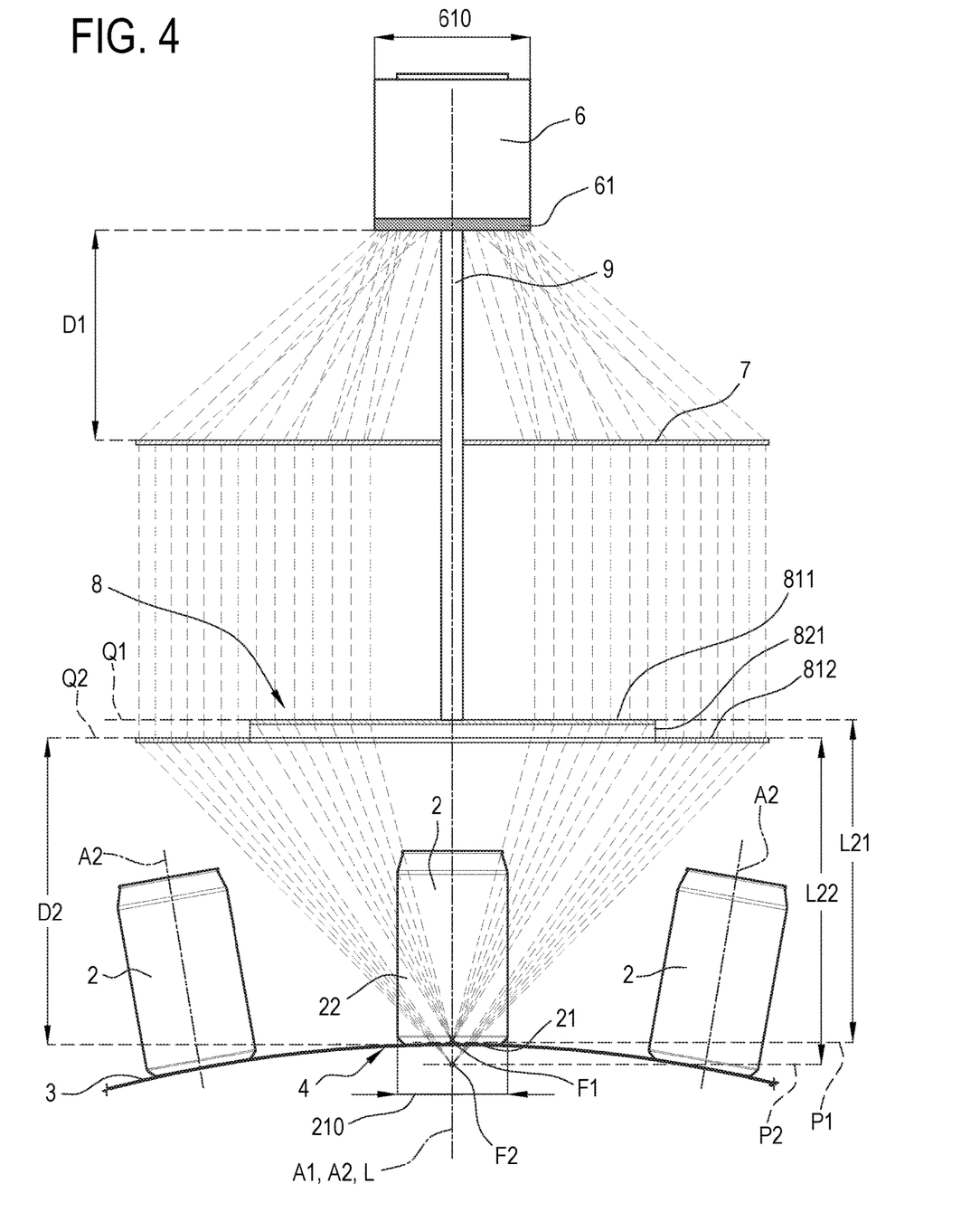
FIGS. 4, 5 and 6 are side views of respective variant embodiments of the apparatus of FIG. 1.
Figure 5:
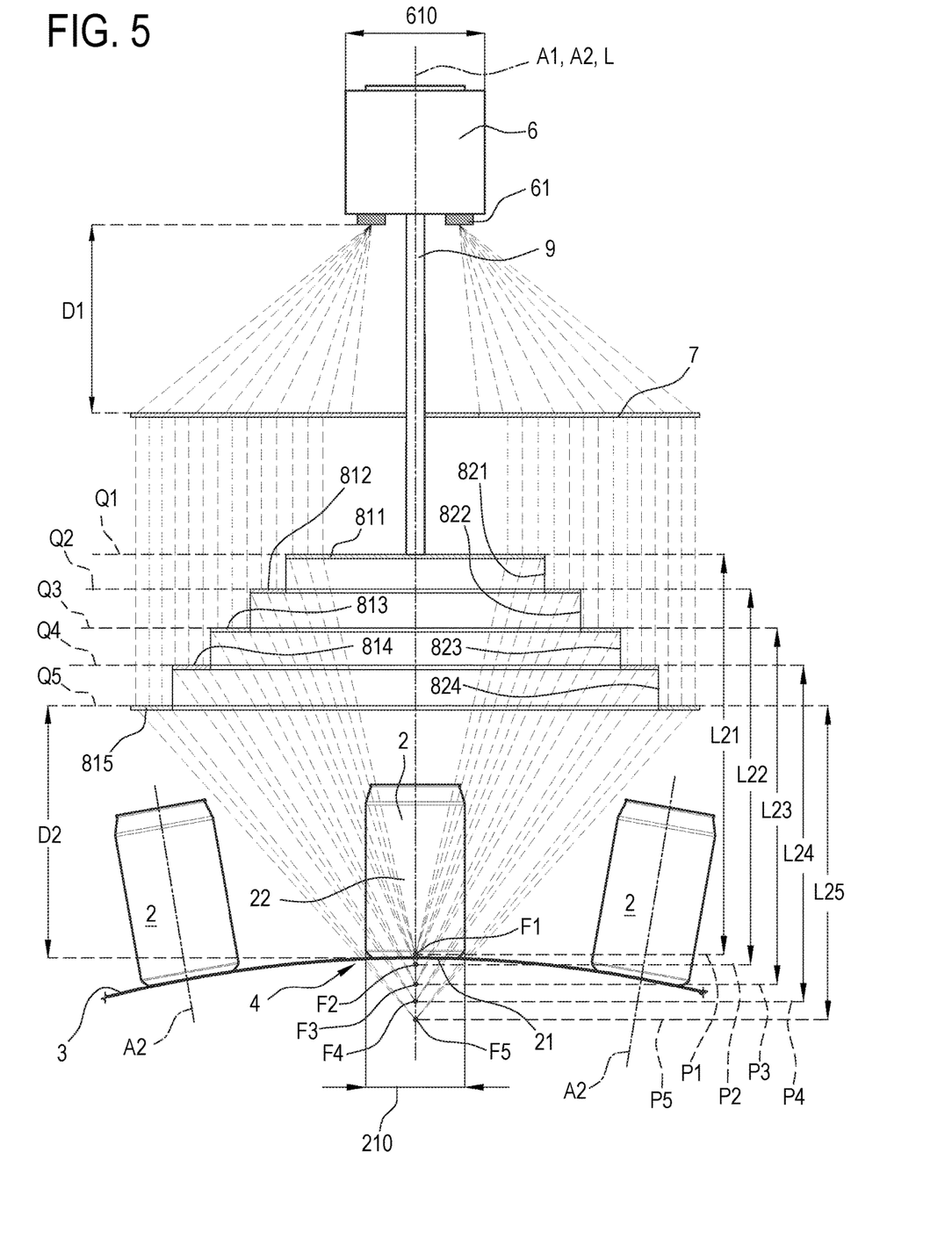
Figure 6:
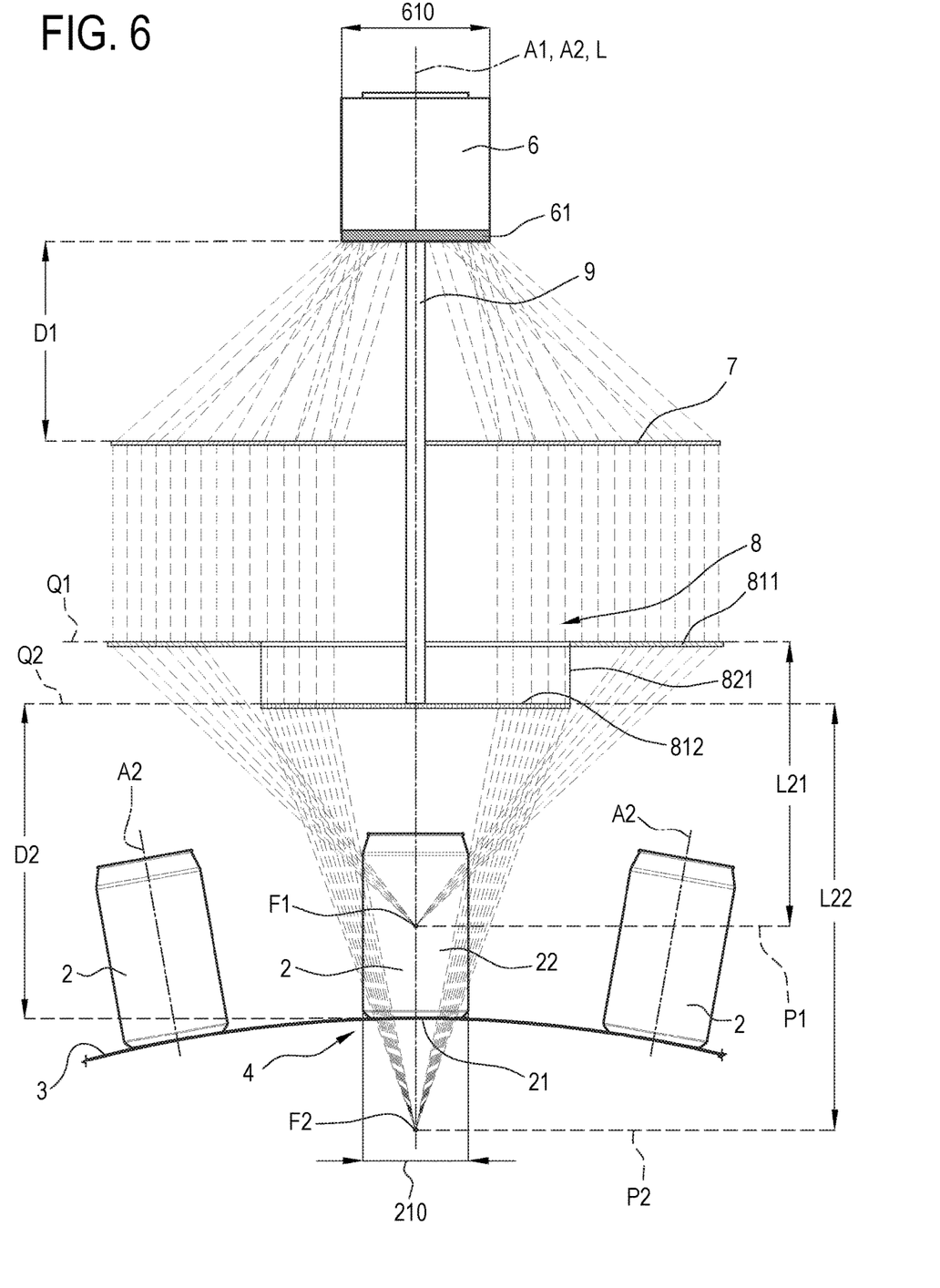

With reference to the drawings, the numeral 1 denotes an apparatus for optical inspection of objects 2.

Each object 2 has a bottom wall 21. Each object 2 has a side wall 22. The side wall 22 extends round a respective axis A2 of the object 2. In one embodiment, the object 2 is cylindrical in geometry.

In one embodiment, the apparatus 1 comprises a conveyor 3. The conveyor 3 is configured to transport the objects 2 in succession. In one embodiment, the conveyor 3 is configured in the form of a belt. In one embodiment, the conveyor 3 is at least partly arcuate.

In one embodiment, the apparatus 1 includes an inspection station 4. The inspection station 4 is disposed along the conveyor 3 (in one embodiment, at an arcuate portion of it). The inspection station 4 is configured to receive an object 2;

the object 2 disposed in the inspection station 4 is also called "object 2 to be inspected". In the inspection station 4, the object 2 to be inspected is positioned with its axis A2 oriented along a longitudinal direction L. The inspection station 4 includes at least one camera 5. In one embodiment, the inspection station 4 includes four cameras 5. The at least one camera 5 (in one embodiment, four cameras 5) is directed at the object 2 to be inspected The at least one camera 5 (in one embodiment, four cameras 5) is configured to capture an image of the side wall 22 of the object 2 to be inspected.

In one embodiment, the side wall 22 of the object 2 is reflective. In one embodiment, the at least one camera 5 is configured to capture light rays reflected from the side wall 22 of the object 2.

The apparatus 1 comprises an illuminator 6. The illuminator 6 is mounted above the inspection station 4 along the longitudinal direction L. The illuminator 6 is configured to emit a beam of light rays towards the conveyor 3. The illuminator 6 comprises a light source 61. In one embodiment, the light source 61 is shaped like a disc. The disc is preferably oriented perpendicularly to the longitudinal direction L. The disc is preferably symmetrical about a central axis A1. The central axis A1 preferably coincides with the axis A2 of the object 2 to be inspected.

In one embodiment, the light source 61 is shaped like a ring (or circular crown). The ring is preferably symmetrical about the central axis A1.

The apparatus 1 comprises a first lens 7. The first lens 7 is interposed between the conveyor 3 and the illuminator 6. The first lens 7 is spaced from the light source 61 by a first distance D1 (of the first lens 7 from the light source 61). The first lens 6 is configured to receive the beam of light rays emitted by the light source 61. The first lens 7 is configured to collimate the light rays and to transmit a corresponding beam of collimated rays along the longitudinal direction L.

The apparatus 1 comprises a second lens 8. The second lens 8 is interposed between the conveyor 6 and the first lens 7. Hence the first lens 7 is interposed between the light source 61 and the second lens 8. Hence the first lens 7 and the second lens 8 are interposed between the light source 61 and the conveyor 3. The second lens 8 is configured to receive the beam of collimated rays. The second lens 8 is configured to direct the light rays towards the side wall 22 of the object 2. That way, the light rays converge on the object 2.

The second lens 8 includes a plurality of portions. The plurality of portions includes at least a first portion 811 and a second portion 812. The plurality of portions may include a third portion 813. The plurality of portions may include a fourth portion 814. The plurality of portions may include a fifth portion 815. The first portion 811 has a respective focus F1 belonging to a respective focal plane P1. The first portion 811 has a respective focal length L21 (given by the distance of the first portion 811 from the respective focal plane P1). The second portion 812 has a respective focus F2 belonging to a respective focal plane P2. The second portion 812 has a respective focal length L22 (given by the distance of the second portion 812 from the respective focal plane P2). The third portion 813 (if present) has a respective focus F3 belonging to a respective focal plane P3. The third portion 813 has a respective focal length L23 (given by the distance of the third portion 813 from the respective focal plane P3). The fourth portion 814 (if present) has a respective focus F4 belonging to a respective focal plane P4. The fourth portion 814 has a respective focal length L24 (given by the distance of the fourth portion 814 from the respective focal plane P4).

The fifth portion 815 (if present) has a respective focus F5 belonging to a respective focal plane P5. The fifth portion 815 has a respective focal length L25 (given by the distance of the fifth portion 815 from the respective focal plane P5). The focal planes P1, P2, P3, P4, P5 of the different portions 811, 812, 813, 814, 815 are offset from each other along the longitudinal direction L.

In one embodiment, at least one of the portions 811, 812, 813, 814, 815 has the shape of a circular crown. The portions 811, 812 are concentric with each other. In one embodiment, the portions 811, 812, 813 are concentric with each other. In one embodiment, the portions 811, 812, 813, 814 are concentric with each other. In one embodiment, the portions 811, 812, 813, 814, 815 are concentric with each other. In one embodiment, the first portion 811 (the central portion) is shaped like a disc which is symmetrical about the central axis A1. In one embodiment, a second portion 812, which is shaped like a circular crown, extends around the first portion 811. In one embodiment, a third portion 813, which is also shaped like a circular crown, extends around the second portion 812 shaped like a circular crown. In one embodiment, a fourth portion 814, which is also shaped like a circular crown, extends around the third portion 813 shaped like a circular crown. In one embodiment, a fifth portion 815, which is also shaped like a circular crown, extends around the fourth portion 814 shaped like a circular crown.

In one embodiment, the portions 811, 812 (and, if present, 813, 814, 815) of the second lens 8 lie in respective position planes Q1, Q2 (Q3, Q4, Q5). In one embodiment, the position planes Q1, Q2 (Q3, Q4, Q5) are parallel to each other and offset along the longitudinal direction L. In one embodiment, the position planes Q1, Q2 (Q3, Q4, Q5) are at right angles to the longitudinal direction L. In one embodiment, the focal lengths L21, L22, (L23, L24, L25) of the portions 811, 812 (813, 814, 815) are equal to each other but the portions 811, 812 (813, 814, 815) lie in different position planes Q1, Q2 (Q3, Q4, Q5). That way, the portions 811, 812 (813, 814, 815) have focuses F1, F2 (F3, F4, F5) which belong to different focal planes P1, P2 (P3, P4, P5).

In one embodiment, the portions 811, 812 (and, if present, 813, 814, 815) are joined to each other by connecting elements 821 (and, if necessary, 822, 823, 824). In one embodiment, the connecting elements 821 (and, if necessary, 822, 823, 824) are shaped like cylinders oriented parallel to the longitudinal direction L (with the central axis A1 as axis of symmetry). In one embodiment, the connecting elements 821 (and, if necessary, 822, 823, 824) are transparent glasses. The connecting elements 821 (and, if necessary, 822, 823, 824) are designed to connect and support the portions 811, 812 (and, if present, 813, 814, 815) of the second lens 8 In one embodiment, the first portion 811 (the central portion) is fixed to a supporting column 9 (oriented along the central axis A1). In one embodiment, the outermost portion is fixed to the supporting column 9 (oriented along the central axis A1). In one embodiment, the supporting column 9 is also fixed to, and supports, the first lens 7. In one embodiment, the supporting column 9 is also fixed to the illuminator 6. In one embodiment, the outermost portion is fixed to a supporting element.

In one embodiment, the portions disposed at positions proximal to the central axis A1 are relatively further away from the conveyor 3 (that is, from the plane which the bottom wall 21 of the object 2 to be inspected rests on) than the portions which are disposed at positions distal from the central axis. In one embodiment, the first (central) portion 811 is further away from the conveyor 3 (that is, from the plane which the bottom wall 21 of the object 2 to be inspected rests on) than the other portions 812 (813, 814, 815). In one embodiment, the outermost portion is spaced from the conveyor 3 (that is, from the plane which the bottom wall 21 of the object 2 to be inspected rests on) by a second distance D2 (also referred to as distance of the second lens 8 from the conveyor 3, that is, from the plane which the bottom wall 21 of the object 2 to be inspected rests on).

In one embodiment, the portions disposed at positions distal from the central axis A1 are relatively further away from the conveyor 3 (that is, from the plane which the bottom wall 21 of the object 2 to be inspected rests on) than the portions which are disposed at positions proximal to the central axis. In one embodiment, the outermost portion is further away from the conveyor 3 (that is, from the plane which the bottom wall 21 of the object 2 to be inspected rests on) than the other portions. In one embodiment, the first portion 811 (the central, innermost portion) is spaced from the conveyor 3 (that is, from the plane which the bottom wall 21 of the object 2 to be inspected rests on) by the second distance D2 (referred to as distance of the second lens 8 from the conveyor 3, that is, from the plane which the bottom wall 21 of the object 2 to be inspected rests on).

In one embodiment, the portions 811, 812 813 are coplanar (that is, they all lie in the same position plane Q1) and have focal lengths L21, L22, L23 which differ from each other. That way, the portions 811, 812, 813 have focuses F1, F2 F3 which belong to different focal planes P1, P2, P3. In this embodiment, the second distance D2 of the second lens 8 from the conveyor 3 is defined by the distance between the single position plane Q1, which the portions 811, 812, 813 lie in, and the plane which the bottom surface 21 of the object 2 rests on. In one embodiment, the lens 8 is a graduated lens 8.

In one embodiment, the second distance D2 (that is, the minimum distance of the second lens 8 from the conveyor 3) is less than the first distance D1 (that is, the distance of the first lens 7 from the light source 61).

In one embodiment, the first lens 7 is a Fresnel lens. In one embodiment, the second lens 8 includes a plurality of Fresnel lenses or portions of Fresnel lenses.

This disclosure also provides an optical system. The optical system comprises a support surface. In one embodiment, the support surface is defined by a conveyor 3. The support surface is configured to receive and support an object 2. The object 2 has a bottom wall 21 which is supported on the support surface. The object 2 has a side wall 22 which extends round an axis A2 of the object 2.

The optical system comprises an illuminator 6. The illuminator 6 is mounted above the support surface along a longitudinal direction L, at right angles to the support surface, to emit a beam of light rays towards the support surface.

The optical system comprises a first lens 7. The first lens 7 is interposed between the support surface and the illuminator 6, to receive the beam of light rays, and is configured to transmit a corresponding beam of collimated rays along the longitudinal direction L.

The optical system comprises a second lens 8. The second lens 8 is interposed between the support surface and the first lens 7, to receive the beam of collimated rays, and is configured to make the light rays converge on the side wall 22 of the object 2 to be inspected. The second lens 8 includes a plurality of portions 811, 812 (and, if necessary, 813, 814, 815) which have respective focuses F1, F2 (F3, F4, F5) belonging to different focal planes P1, P2 (P3, P4, P5) which are offset along the longitudinal direction L. Thus, in at least one embodiment, the focal points, or focuses, F1, F2 (F3, F4, F5) differ from each other. The focal planes P1, P2 (P3, P4, P5) are parallel to each other. In one embodiment, the portions 811, 812 (and, if necessary, 813, 814, 815) of the plurality are concentric with a central axis A1. In one embodiment, at least one of the portions 811, 812 (813, 814, 815) has the shape of a circular crown.

In one embodiment, the portions 811, 812 (813, 814, 815) lie in respective position planes Q1, Q2 (Q3, Q4, Q5) which are offset from each other. In another embodiment, the portions 811, 812 (813, 814, 815) are coplanar, that is to say, they lie in a single position plane Q1.

This disclosure also provides a method for optical inspection of objects 2.

In one embodiment of it, the method comprises a step of conveying the objects 2 in succession on a conveyor 3. Each object 2 has a bottom wall 21. The bottom wall 21 is supported by the conveyor 3 (on a support surface). Each object 2 has a side wall 22. The side wall 22 extends round a respective axis A2 (which is the axis of the object). In one embodiment, the conveyor 3 is arcuate.

The method comprises a step of receiving an object 2 to be inspected in an inspection station 4 positioned along the conveyor 3, where the axis A2 of the object 2 is oriented along a longitudinal direction L.

In one embodiment of it, the method comprises a step of emitting a beam of light rays (towards the conveyor 3) by means of an illuminator 6. The illuminator comprises a light source 61 which emits the beam of light rays. The illuminator 6 is positioned above the inspection station 4, along the longitudinal direction L.

In one embodiment, the light source 61 is shaped like a disc and has a diameter 610. In one embodiment, the diameter 610 of the light source is greater than a diameter 210 of the bottom wall 21 of the object 2. In another embodiment, the light source 61 is annular.

In one embodiment, the light source 61 is symmetrical about a central axis A1. In one embodiment, the central axis A1 coincides with the axis A2 of the object 2, positioned in the inspection station 4 (if there are no errors due to the fact that the conveyor 3 may be arcuate).

The method comprises a step of receiving the beam of collimated rays on a first lens 7. The method comprises a step of transmitting a corresponding beam of collimated rays along the longitudinal direction L through the first lens 7.

The method comprises a step of receiving the beam of collimated rays on a second lens 8. The method comprises a step of directing the light rays at the side wall 22 of the object 2 through the second lens 8. The second lens 8 includes at least a first portion 811 and a second portion 812. The first portion 811 and the second portion 812 have respective focuses F1 and F2 on respective different focal planes P1 and P2 which are offset along the longitudinal direction L. Thus, in at least one embodiment, the focal points, or focuses, F1 and F2 differ from each other. The first portion 811 makes a first group of rays converge on the side wall 22 of the object 2. The second portion 812 makes a second group of rays converge on the side wall 22 of the object 2.

In one embodiment, the first portion 811 is shaped like a disc which is symmetrical about the central axis A1 and the second portion 812 is shaped like a circular crown surrounding the first portion 811. In one embodiment, the first portion 811 lies in a position plane Q1 and the second portion 812 lies in a position plane Q2. In one embodiment, the position plane Q2 is closer to the conveyor 3 than the position plane Q1: that way, the first portion 811 directs the first group of rays on an upper part (that is, the part further away from the conveyor 3) of the side wall 22 of the object 2, while the second portion 812 directs the second group of rays on a lower part (that is, closer to the conveyor 3) of the side wall 22 of the object 2. In this embodiment, the first focal plane P1 on which the first focus F1 of the first portion 811 is positioned is closer to the light source 61 than the second focal plane P2 on which the second focus F2 of the second portion 812 is positioned.

In another embodiment, the position plane Q2 is further from the conveyor 3 than the position plane Q1 is: that way, the first portion 811 directs the first group of rays on a lower part (that is, the part closer to the bottom wall 21) of the side wall 22 of the object 2, while the second portion 812 directs the second group of rays on an upper part (that is, further away from the bottom wall 21) of the side wall 22 of the object 2. In this embodiment, the first focal plane P1 on which the first focus F1 of the first portion 811 is positioned is further away from the light source 61 than the second focal plane P2 on which the second focus F2 of the second portion 812 is positioned.

The second lens 8 may include a third portion 813. The third portion 813 makes a third group of rays converge on the side wall 22 of the object 2. The second lens 8 may include a fourth portion 814. The fourth portion 814 makes a fourth group of rays converge on the side wall 22 of the object 2. The second lens 8 may include a fifth portion 815. The fifth portion 815 makes a fifth group of rays converge on the side wall 22 of the object 2. The third portion 813, fourth portion 814 and fifth portion 815 are shaped like circular crowns which are concentric with the central axis A1. The first portion 811, second portion 812, third portion 813, fourth portion 814 and fifth portion 815 form a plurality of portions. The third portion 813, fourth portion 814 and fifth portion 815 have respective focuses F3, F4 F5 on respective focal planes P3, P4, P5. The focal planes P1, P2, P3, P4, P5 are offset from each other along the longitudinal direction L.

In one embodiment, the portions which are more proximal to the central axis A1 are further away from the conveyor 3 than are the portions which are more distal from the central axis A1 to direct the light rays towards a part of the side wall 22 of the object 2 further away from the bottom wall 21. In one embodiment, the portions which are more distal from the central axis A1 are further away from the conveyor 3 than are the portions which are more proximal to the central axis A1 to direct the light rays towards a part of the side wall 22 of the object 2 further away from the bottom wall 21.

The method comprises a step of capturing an image of the side wall 22 of the object 2 using at least one camera 5. In one embodiment, the side wall 22 of the object 2 reflects the light rays directed at it by the second lens 8. Thus, during the step of capturing, the camera 5 (or the cameras 5) captures the rays reflected from the side wall 22 of the object 2.

The invention claimed is:

1. An apparatus for optical inspection of objects, comprising:
   a conveyor configured to transport the objects in succession, each object having a bottom wall, which rests on the conveyor, and a side wall extending round a respective axis;
   an inspection station, disposed along the conveyor and configured to receive an object to be inspected oriented with its axis along a longitudinal direction; the inspection station including at least one camera, directed at the object to be inspected, to capture an image of the side wall of the object to be inspected;
   an illuminator mounted above the inspection station along the longitudinal direction to emit a beam of light rays towards the conveyor;
   a collimator, interposed between the conveyor and the illuminator, to receive the beam of light rays, and configured to transmit a corresponding beam of collimated rays along the longitudinal direction;
   a focalizer, including a lens structure interposed between the conveyor and the collimator, to receive the beam of collimated rays, and configured to make the light rays converge on the side wall of the object to be inspected, wherein the lens structure of the focalizer includes a plurality of lens portions which have respective focuses positioned on respective focal planes which are offset along the longitudinal direction.

2. The apparatus according to claim 1, wherein the collimator includes a first lens and the focalizer includes a second lens, including said plurality of lens portions.

3. The apparatus according to claim 2, wherein the illuminator includes a discoidal light source, at right angles to the longitudinal direction and symmetrical about a central axis.

4. The apparatus according to claim 3, wherein at least one of the lens portions of the second lens has the shape of a circular crown and wherein the portions are concentric with the central axis.

5. The apparatus according to claim 4, wherein the lens portions of the second lens lie in respective position planes which are parallel to, and spaced from, each other and at right angles to the longitudinal direction.

6. The apparatus according to claim 4, wherein the lens portions of the second lens disposed at positions proximal to the central axis are relatively further away from the conveyor than the lens portions which are disposed at positions distal from the central axis.

7. The apparatus according to claim 4, wherein the lens portions of the second lens disposed at positions proximal to the central axis are relatively closer to the conveyor than the lens portions which are disposed at positions distal from the central axis.

8. The apparatus according to claim 2, wherein the lens portions of the second lens are coplanar and have focal lengths which differ from each other.

9. The apparatus according to claim 2, wherein the first lens is a Fresnel lens and the second lens includes a plurality of Fresnel lenses or portions of Fresnel lenses.

10. The apparatus according to claim 2, wherein the second distance of the second lens from the conveyor is less than a first distance of the first lens from the light source.

11. The apparatus according to claim 1, wherein the at least one camera is configured to capture light rays reflected from the side wall of the object.

12. The apparatus according to claim 1, wherein the conveyor is at least partly arcuate.

13. A method for optical inspection of objects comprising the following steps:
   conveying the objects in succession on a conveyor; each object having a bottom wall, which rests on the conveyor, and a side wall extending round a respective axis;
   receiving an object to be inspected in an inspection station positioned along the conveyor, where the axis of the object is oriented along a longitudinal direction;
   emitting a beam of light rays towards the conveyor by means of an illuminator mounted above the inspection station along the longitudinal direction;

receiving the beam of light rays through collimator and transmitting a corresponding beam of collimated rays along the longitudinal direction through the collimator, which is interposed between the conveyor and the illuminator;

receiving the beam of collimated rays through a focalizer, the focalizer including a lens structure interposed between the conveyor and the collimator, and, through the focalizer, directing the rays towards the side wall of the object to be inspected;

capturing an image of the side wall of the object using at least one camera facing towards the object to be inspected, wherein, in the context of the rays directed towards the side wall of the object to be inspected, the focalizer makes different groups of rays converge on respective focal points positioned on respective focal planes which are offset along the longitudinal direction.

14. The method according to claim 13, wherein the collimator is a first lens and the focalizer is a second lens.

15. The method according to claim 13, wherein the illuminator includes a discoidal light source whose diameter is greater than a diameter of the bottom wall of the object to be inspected and which is symmetrical about a central axis coinciding with the axis of the object to be inspected positioned in the inspection station.

16. The method according to claim 15, wherein the second lens includes a plurality of lens portions, at least one of which has the shape of a circular crown and wherein the lens portions of the second lens are concentric with the central axis.

17. The method according to claim 13, wherein the side wall of the object to be inspected reflects the light rays directed towards it and the at least one camera, during the step of capturing, captures the rays reflected from the side wall of the object to be inspected.

18. An optical system comprising:
a support surface configured to receive and support an object, the object having a bottom wall, which is supported by the support surface, and a side wall extending round a respective axis;
an illuminator mounted above the support surface along a longitudinal direction, at right angles to the support surface, to emit a beam of light rays towards the support surface;
a collimator, interposed between the support surface and the illuminator, to receive the beam of light rays, and configured to transmit a corresponding beam of collimated rays along the longitudinal direction;
a focalizer, including a lens structure interposed between the support surface and the illuminator, to receive the beam of collimated rays, and configured to make the light rays converge on the side wall of the object to be inspected,
wherein the lens structure of the focalizer includes a plurality of lens portions which have respective focuses positioned on focal planes which are offset along the longitudinal direction.

19. The optical system according to claim 18, comprising a collimator, interposed between the support surface and the illuminator, to receive the beam of light rays, and configured to transmit a corresponding beam of collimated rays along the longitudinal direction, wherein the focalizer is interposed between the support surface and the collimator.

20. The optical system according to claim 19, wherein the collimator includes a first lens and the focalizer includes a second lens, including said plurality of lens portions.

* * * * *